(12) United States Patent
Dahn et al.

(10) Patent No.: US 6,168,887 B1
(45) Date of Patent: Jan. 2, 2001

(54) LAYERED LITHIUM MANGANESE OXIDE BRONZE AND ELECTRODES THEREOF

(75) Inventors: Jeffrey R. Dahn, Hubley; Jens M. Paulsen, Halifax, both of (CA)

(73) Assignee: Chemetals Technology Corporation, Baltimore, MD (US)

(*) Notice: Under 35 U.S.C. 154(b), the term of this patent shall be extended for 0 days.

(21) Appl. No.: 09/231,636

(22) Filed: Jan. 15, 1999

(51) Int. Cl.[7] .............................. H01M 4/50; H01M 4/32; H01M 4/58; H01M 4/36; B32B 9/00
(52) U.S. Cl. .................. 429/224; 429/223; 429/231.1; 429/231.2; 429/231.3; 429/220; 429/231.95; 428/701; 428/702
(58) Field of Search .................. 429/231.95, 231.1, 429/231.2, 231.3, 220, 224, 223; 428/701, 702

(56) References Cited

U.S. PATENT DOCUMENTS

| | | | |
|---|---|---|---|
| 5,264,201 | * 11/1993 | Dahn et al. | 423/594 |
| 5,487,960 | * 1/1996 | Tanaka | 429/218 |
| 5,629,110 | * 5/1997 | Kobayashi et al. | 429/223 |
| 5,700,597 | * 12/1997 | Zhong et al. | 429/218 |
| 5,858,324 | * 1/1999 | Dahn et al. | 423/596 |
| 6,045,771 | * 3/2000 | Matsubara et al. | 423/593 |

OTHER PUBLICATIONS

M. Tabuchi, et al., J. Electrochem. Soc, 145, L49–L52 (1998).
C. Delmas et al., Revue de Chimie Minerale 19, 343 (1982).
C. Fouassier, et al., Materials Research Bulletin 10, 443 (1975).
A.R. Armstrong and P.G. Bruce, Nature 381, 499 (1996).
G. Vitins and K. West, J. Electrochem Soc. 144, 2587 (1997).
F. Capitaine, et al., Solid State Ionics 89, 197 (1996).
C. Delmas, et al. Solid State Ionics 3/4, 165 (1981).
L.W. Shacklette, J. Electrochem Soc. 135, 2669 (1988).
J.R. Dahn, J. Electrochem Soc. 145, 851 (1998).
J.P. Parant, et al., Chem. 3. (1971).
M. Doeff, et al., J. Electrochem. Soc. 143, 2507 (1996).
A.R. Armstrong, J. Mater. Chem. 8, 255 (1998).
R.J. Balsys, Solid State Ionics 93, 279 (1996).
C. Delmas, et al., Mat. Res. Bull. 117 (1982).

* cited by examiner

Primary Examiner—Steven P. Griffin
Assistant Examiner—Jonas N. Strickland
(74) Attorney, Agent, or Firm—Venable

(57) ABSTRACT

This invention relates to layered $LiMnO_2$ and $Li_xMn_{0.82}Co_{0.18}O_2$. They are useful in rechargeable batteries.

25 Claims, 8 Drawing Sheets

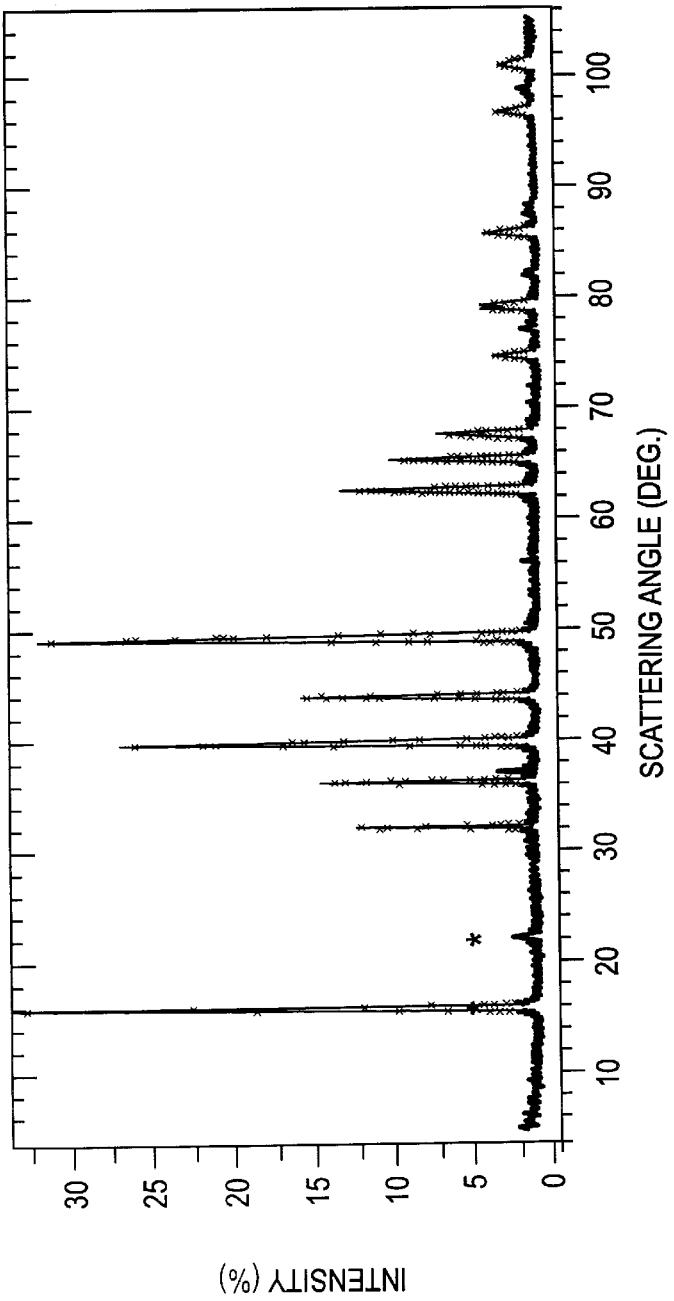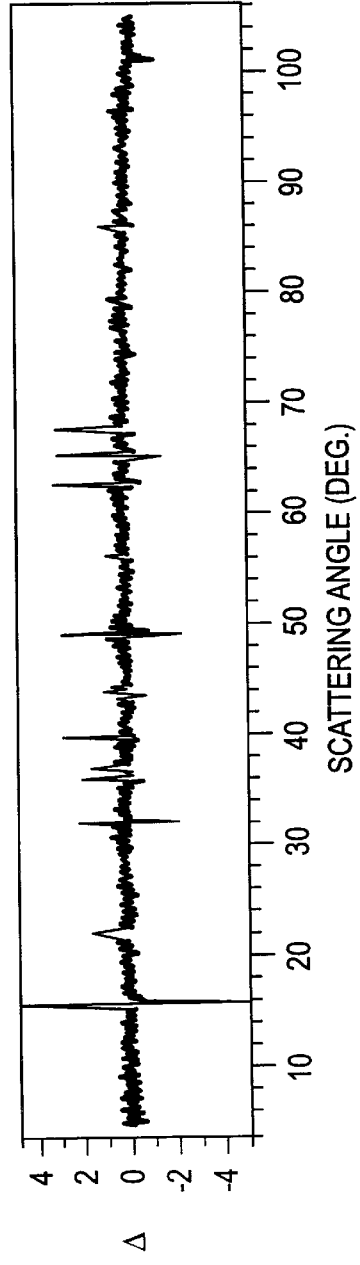
FIG. 1A
FIG. 1B

US 6,168,887 B1

LAYERED LITHIUM MANGANESE OXIDE BRONZE AND ELECTRODES THEREOF

FIELD OF THE INVENTION

The invention relates to layered lithium manganese oxide bronzes, to their production, and to electrodes comprising these bronzes, as well as use of those electrodes.

BACKGROUND OF THE INVENTION

Layered $A_xMnO_y$ bronzes are classified into different categories, by Delmas et. al, *Revue de Chimie Minerale* 19, 343 (1982); the categories are distinguished by the stacking of the oxygen: ABCABC . . . (O3); II: ABBA . . . (P2); and III: ABBCCA . . . (P3). Those three different categories, O3, P2 and P3, are defined by a letter followed by a number: The letter may be O or P and refers to the oxygen environment of the alkali ion. The letter O refers to an octahedral environment of the alkali metal, while the letter P refers to a prismatic environment. The number indicates the number of $MO_2$ sheets within the unit cell; M in $MO_2$ refers to the 3d transition metal in the formula $A_xMO_y$; and M is Mn when the bronze is $A_xMnO_y$.

Layered bronzes and their structures are of interest as cathodes in rechargeable lithium batteries since layered structure types, more than any other, enable the reversible intercalation of lithium. The term "intercalation" herein means "the reversible insertion of guest atoms (Li, in this case) into host solids, such that the structure of the host is not significantly changed". $LiCoO_2$ and $LiNiO_2$ are good examples of layered materials which are used in Li-ion batteries. The preparation of the corresponding $LiMnO_2$ is motivated by the fact that Mn is non-toxic and abundant. Unfortunately, solid-state reaction at high temperature to prepare layered $LiMnO_2$ has been unsuccessful since the non-layered structures $LiMn_2O_4$(spinel), $LiMnO_2$ (orthorhombic) or $Li_2MnO_3$ (rocksalt) are more stable.

Layered $LiMnO_2$ of the O3 type has been prepared and reported by Armstrong and P. G. Bruce, Nature 381, 499 (1996). The layered $LiMnO_2$ samples were able to deintercalate large amounts of lithium, for example, Bruce and Armstrong reported 250 mAh/g, or about 90% of the Li atoms, on the first charge. Unfortunately the layered O3 phase converts to spinel during cycling, which leads to rapid capacity loss. Recently, the "direct" preparation of layered $LiMnO_2$ by a soft chemical route was reported by Tabuchi et al. *J. Electrochem. Soc.* 145 L49–52 (1998), but their material also seems to convert to spinel upon cycling.

The layered O3 $LiMnO_2$ structure is very close to the structure (space group $I4_1/amd$) of lithiated spinel $Li_2Mn_2O_4$. The structures differ only by a minor cationic arrangement. Consequently, a conversion of layered $LiMnO_2$ of O3 structure to spinel during cycling can be expected. This is because the composition of $Li_xMnO_2$ becomes equal to that of the thermodynamically stable phase, spinel $LiMn_2O_4$, at x=½.

Layered α-$NaMnO_2$ exhibits an O3 structure. The O3 structure has octahedral sodium sites. Lithium prefers these octahedral sites. Therefore, the O3 structure can remain undisturbed during ion exchange. However, the P2 structure, with prismatic sodium sites, transforms to O2, and P3 transforms to O3, respectively. These transformations are possible since only a gliding of $MnO_2$ layers is required. Consequently, ion exchange of P3 manganese bronzes will finally lead to an O3 structure which is similar to the O3 structure obtained by ion exchanging an O3 sodium bronze. Layered lithium manganese oxides of the O3 type convert to spinel during cycling. Therefore, only ion exchange of manganese bronzes of different types than P3 or O3 is promising for Li-ion battery applications.

This work investigates lithium manganese oxides having the O2 structure obtained by ion exchange of P2-type sodium manganese bronzes. The O2 structure is very different from the spinel structure. The O3 structure has an oxygen stacking which differs fundamentally from P2. In O3 and spinel, all hexagonal close-packed O-M-O layers (M=cation) differ only by a translation, ABC→BCA; the O3 structure can transform gradually to spinel by minor changes in cation positions. In P2, every second layer is mirrored, ABC→CBA, and therefore different by symmetry. The same is true for O2. So the transformation of P2 or O2 to spinel can only occur by a rearrangement of the oxygen lattice which requires the breaking of all MnO bonds. This is highly unlikely at room temperature. Consequently it can be expected that lithium manganese oxide with the O2 structure will not be able to transform to spinel during battery operation. Its stacking will remain unchanged and it will cycle well.

Here the layered P2 structure is converted to O2 configuration. Moreover, it has been reported, by C. Delmas et al. in *Solid State Ionics* 3/4, 165 (1981) and L. W. Schacklette et al., *J. Electrochem. Soc.* 145.2669 (1988), that P2 structures do not convert to O3 structures for sodium intercalation in $Na_xCoO_2$. $Na_xCoO_2$ can be prepared in the three different crystal structures P2, O3 and P3. Starting the charge-discharge cycling of Na/$Na_xCoO_2$ cells with either P3 or O3 $Na_xCoO_2$ leads to the same voltage profile, proving that during cycling O3 and P3 transform to each other. The phase transformation is reversible and connected with a hysteresis between the charge and discharge voltage profiles. P2 structure $Na_xCoO_2$ did not show a conversion to P3 or O3 based on the difference of its voltage profile.

SUMMARY OF THE INVENTION

For the first time a layered lithium manganese oxide was prepared which could be used as cathode material in lithium batteries without rapid transformation to spinel. These materials are based on the O2 structure which cannot transform to spinel without breaking all the Mn—O bonds in the sample. The O2 phases have a reversible capacity in the range of 150 mAh/g to 210 mAh/g if cycled between 2V and 4.8V vs. Li. These phases can be prepared by ion exchanging sodium manganese bronzes of the P2 type.

DESCRIPTION OF THE DRAWINGS

FIGS. 1A and 1B constitute X-ray diffraction pattern and Rietveld refinement of the P2-type $Na_{2/3}[Li_{1/6}Mn_{5/6}]O_2$. The asterisks mark the positions of peaks due to a possible superstructure.

FIG. 2A: $LiMnO_2$ from α-$NaMnO_2$ (O3);

FIG. 2B: $Li_{2/3}[Li_{1/6}Mn_{5/6}]O_2$ obtained from $Na_{2/3}[Li_{1/6}Mn_{5/6}]O_2$ (P2);

FIG. 2C: $Li_{2/3}[Li_{1/6}(Mn_{0.82}Co_{0.18})_{5/6}]O_2$ obtained from $Na_{2/3}[Li_{1/6}(Mn_{0.82}Co_{0.18})_{5/6}]O_2$ (P2); and FIG. 2D: $Li_{0.7}MnO_{2+y}$ obtained from low temperature $Na_{0.7}MnO_{2+y}$.

FIG. 3A: LiMnO$_2$ from α-NaMnO$_2$ (O3);

FIG. 3B: Li$_{2/3}$[Li$_{1/6}$Mn$_{5/6}$]O$_2$ obtained from Na$_{2/3}$[Li$_{1/6}$Mn$_{5/6}$]O$_2$ (P2);

FIG. 3C: Li$_{2/3}$[Li$_{1/6}$\{Mn$_{0.82}$Co$_{0.18}$\}$_{5/6}$]O$_2$ obtained from Na$_{2/3}$[Li$_{1/6}$\{Mn$_{0.82}$Co$_{0.18}$\}$_{5/6}$]O$_2$ (P2); and FIG. 3D: Li$_{0.7}$MnO$_{2+y}$ obtained from low temperature Na$_{0.7}$MnO$_{2+y}$ FIG. 4: X-ray diffraction pattern for Li$_{2/3}$MO$_2$ with smaller Mn oxidation state (thick lines) obtained by ion exchanging the corresponding sodium bronze Na$_{2/3}$MO$_2$ (thin lines):

DETAILED DESCRIPTION

Figure 2A:
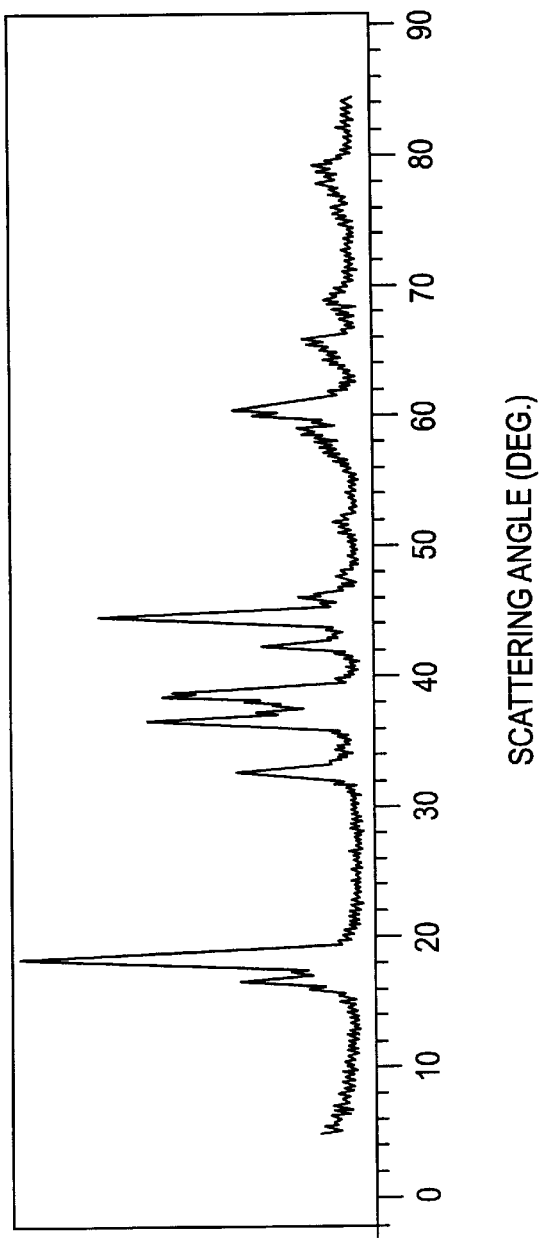
FIGS. 2A–2D include X-ray diffraction patterns of different lithium manganese oxides obtained by ion exchange, as follows.

The invention relates to a layered bronze, of the empirical formula Li$_x$(Mn$_{1-y}$My)O$_{2+z}$; in the formula, x is 0.5<x<1.3; y is 0.0≦y<0.4; z is −0.5<z<0.5; M is a 3d transition metal, aluminum or lithium and admixtures thereof and Li is lithium; Mn is manganese and has an oxidation state which is less than 4+. X is oxygen atom(s) which may be substituted for fluorine and/or sulfur atoms. The layered bronze exhibits a reversible charge capacity in units of mAh/g, when used as an electrode (e.g. a cathode) and is cycled between 2V and 4.8V vs. Li. In these bronzes embraced by the formula Li$_x$(Mn$_{1-y}$M$_y$)O$_{2+z}$ each of the Li (lithium) and Mn (manganese) is in octahedral coordination. The coordination about Li is most significant, as it distinguishes the O (octohedral) from the P (prismatic) phases. In that formula, M is selected from the group consisting of Ni, Co, Ti, Fe, V, Cr, Cu, and Li, and is preferably cobalt or lithium. The unit(s) "mAh/g" is milliampere hours/gram. The characteristic of reversibe charge capacity endures during repetitive cycling as an electrode at 2V and 4.8V; and during that cycling the layered bronze remains free of non-layered spinel.

Layered bronzes of this invention comprise a stack of alternating O—(Mn$_{1-y}$M$_y$)-O layers (type I) and layers containing lithium (type II), stacked perpendicular to these layers. An O—(Mn$_{1-y}$M$_y$)-O layer consists of an (Mn$_{1-y}$M$_y$) sublayer sandwiched between two O sublayers. The atoms within each sublayer are placed on sites of a (possibly distorted) hexagonal lattice, these lattices being arranged such that the Mn or M atoms are each surrounded by six oxygen atoms forming corners of an octahedron (i.e. they are octahedrally coordinated). The lithium atoms of the type-II layer containing lithium, too, are placed on sites of a (possibly distorted) hexagonal lattice; these sites will be called L-sites. Some of these L-sites may not be filled with lithium atoms, particularly when this bronze is cycled in an electrochemical cell. However, the L-sites themselves will always be surrounded by six oxygen atoms forming the corners of an octahedron. Each oxygen atom is surrounded by three L-sites and three sites for Mn or M. The specific arrangements of these six sites will lead to either an octahedral coordination (the six sites form the corners of an octahedron) or a prismatic coordination (the six sites form the corners of a triangular prism). All oxygen atoms of a certain O sublayer will have the same coordination. The layered bronzes of this invention are characterized in that at least some oxygen atoms are prismatically coordinated. The occurrence of this prismatically coordinated oxygen is believed to result in the stability of this bronze, in preventing conversion to a spinel structure. Such stability is desirable for a material used in a rechargeable electrochemical cell.

In a specific embodiment of this invention, this stack of type-I and type-II layers forms an O2 structure, according to the Delmas categorization described above. In this embodiment, four layers form a repeating unit of the type Li—O—(Mn$_{1-y}$M$_y$)-O— Li—O—(Mn$_{1-y}$M$_y$)-O, where O sublayers with prismatically and octahedrally coordinated oxygen alternate. Some of the embodiments herein exhibit a unit cell dimension perpendicular to the layers of 9.608 or 9.8 Å for this repeating unit. This dimension will vary depending on the exact composition and stoichiometry.

Layered bronzes are susceptible to faults in the stack, so this invention includes both materials free of stacking fault and materials with stacking faults, leading to structures other than O2. Stacking faults are defined as displacements parallel to the layer direction. Stacking faults imply that the repeating unit would change within a stack.

The atoms of the layers are characterized by the coordination described hereafter. All cations or metal atoms of the bronzes of the invention are in octahedral coordination with the surrounding oxygen atoms; that is each is surrounded by six oxygen atoms. Some of the oxygen atoms of these layered bronzes are prismatically coordinated by metal atoms; those oxygen atoms which are said to be prismatically coordinated are surrounded by 6 cations or metal atoms; and some oxygen atoms are octahedrally coordinated by metal atoms. The occurrence of the prismatic oxygens is believed to result in the stability of the bronze, in preventing conversion to spinel.

Specific species of the layered bronzes include Li$_{2/3}$(Li$_{1/6}$Mn$_{5/6}$)O$_2$ and Li$_{2/3}$(Li$_{1/6}$\{Mn$_{0.82}$Co$_{0.18}$\}$_{5/6}$)O$_2$. Characterization of the bronzes was in part based on X-ray diffraction studies. By way of illustration, FIG. 2c is an X-ray diffraction pattern of Li$_{2/3}$[Li$_{1/6}$(Mn$_{0.82}$CO$_{0.18}$)$_{5/6}$]O$_2$. The X-ray diffraction pattern of FIG. 2C be understood on the basis of an O2 phase displaying some stacking faults. Stacking faults cause those Bragg peaks with mixed Miller indices (i.e. h01) to be broad, and those with non-mixed Miller indices (i.e. hk0 to 001) to be sharp. The table below shows the observed and calculated scattering angles for the sample described by FIG. 2c, based on a hexagonal unit cell with dimensions a=2.837 Å and c=9.608 Å. The calculated positions agree well with those observed. FIG. 2c also shows that the 101, 103, and 105 peaks are broad, while the peaks with non-mixed indices are sharp, consistent with some stacking faults in the O2 structure.

| h | k | l | 2θ$_{obs}$ | 2θ$_{calc}$ | d$_{calc}$ |
|---|---|---|------|------|--------|
| 0 | 0 | 2 | 18.34 | 18.468 | 4.8039 |
| 1 | 0 | 0 | 36.60 | 36.576 | 2.4567 |
| 1 | 0 | 1 | 37.50 | 37.797 | 2.3801 |
| 1 | 0 | 3 | 46.60 | 46.592 | 1.9492 |
| 1 | 0 | 5 | 61.00 | 61.238 | 1.5136 |
| 1 | 1 | 0 | 65.90 | 65.846 | 1.4184 |
| 1 | 1 | 2 | 69.10 | 69.041 | 1.3603 |

It is expected that the lattice constants of the O2 phase will vary with its compositions. The position of the significant lines can be measured to plus/minus 0.2 degrees.

However, the position of the significant lines will change by much more than that as the stoichiometry of the O2 phase varies. For O2 phases displaying hexagonal axes, the scattering angles of the Bragg peaks can be calculated from the lattice constants as follows. First, the atomic plane spacings are calculated from the Miller indices, h, k and l.

$$\frac{1}{d^2} = \frac{4(h^2 + k^2 + hk)}{3a^2} + \frac{1}{c^2}$$

Then the scattering angle is given by $2\theta$, where $\theta$ is the Bragg angle given by $\sin(\theta)=\lambda/2d$, where $\lambda$ is the wavelength of the x-ray.

Thus, the positions of the significant diffraction peaks for any hexagonal O2 structure can be calculated from its lattice constants.

The crystal structure of the hexagonal O2 phase of ideal stoichiometry $Li_{2/3}MnO_2$, without stacking faults can be understood as that of a Bravais Lattice with an 8 atom basis. The fractional atomic coordinates of the 8 atoms in the unit cell are given in the table below, where u is about 0.125.

| Atom | X (fractional coord) | Y (fractional coord) | Z (fractional coord) |
|---|---|---|---|
| Li (⅔ occupancy) | ⅔ | ⅓ | -½ |
| O | 0 | 0 | -½ + u |
| Mn | ⅓ | ⅔ | -¼ |
| O | ⅔ | ⅓ | -u |
| Li (⅔ occupancy) | ⅓ | ⅔ | 0 |
| O | 0 | 0 | U |
| Mn | ⅔ | ⅓ | ¼ |
| O | ⅓ | ⅔ | ½ - u |

When transition metals or Li are substituted for Mn, these randomly replace Mn on its sites.

The synthesis of layered sodium manganese bronze was an initial stage in the production of the lithium manganese bronzes of the invention. The layered sodium manganese bronzes having the P2 structure ($Na_{2/3}[Li_{1/6}Mn_{5/6}]O_2$) were used to prepare layered lithium manganese oxides by ion exchange of Na by Li using LiBr in n-hexanol. X-ray diffraction and chemical analysis shows that the resulting layered $Li_{2/3}[Li_{1/6}Mn_{5/6}]O_2$ has the O2 structure. The arrangement of manganese and oxygen atoms in this phase differs fundamentally from that found in layered $LiMnO_2$ (o3 structure), in orthorhombic $LiMnO_2$ and in spinel $Li_2Mn_2O_4$ so that conversion to spinel during electrochemical cycling is not expected. $Li_{2/3}[Li_{1/6}Mn_{5/6}]O_2$ has a reversible charge capacity of ≅150 mAh/g. During cycling the new cathode material does not convert to spinel unlike that found in layered and orthorhombic $LiMnO_2$.

Figure 2B:
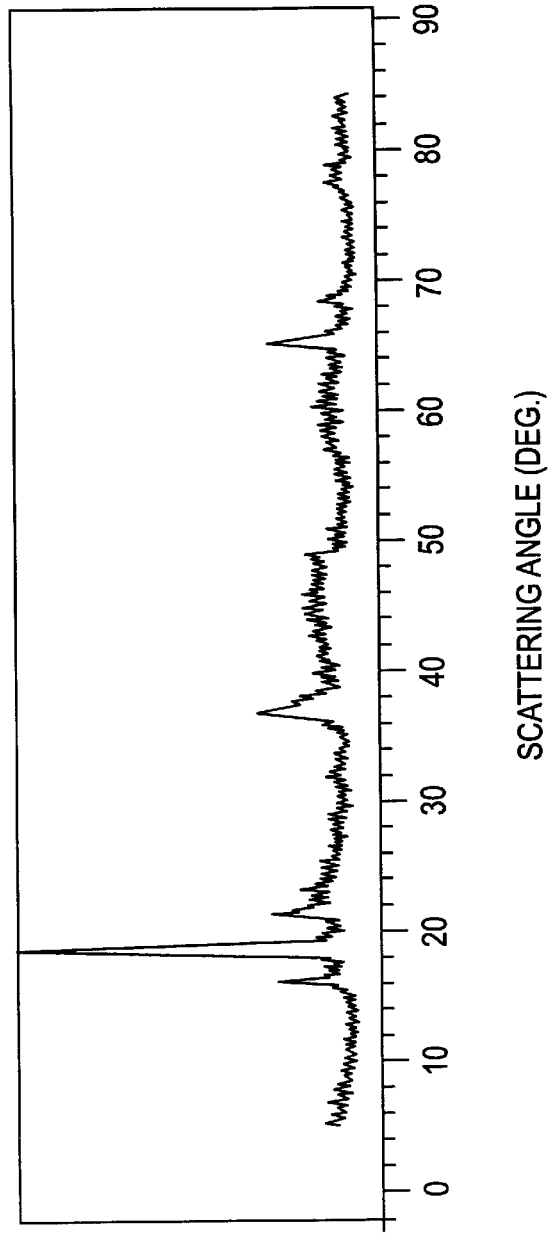
Figure 2C:
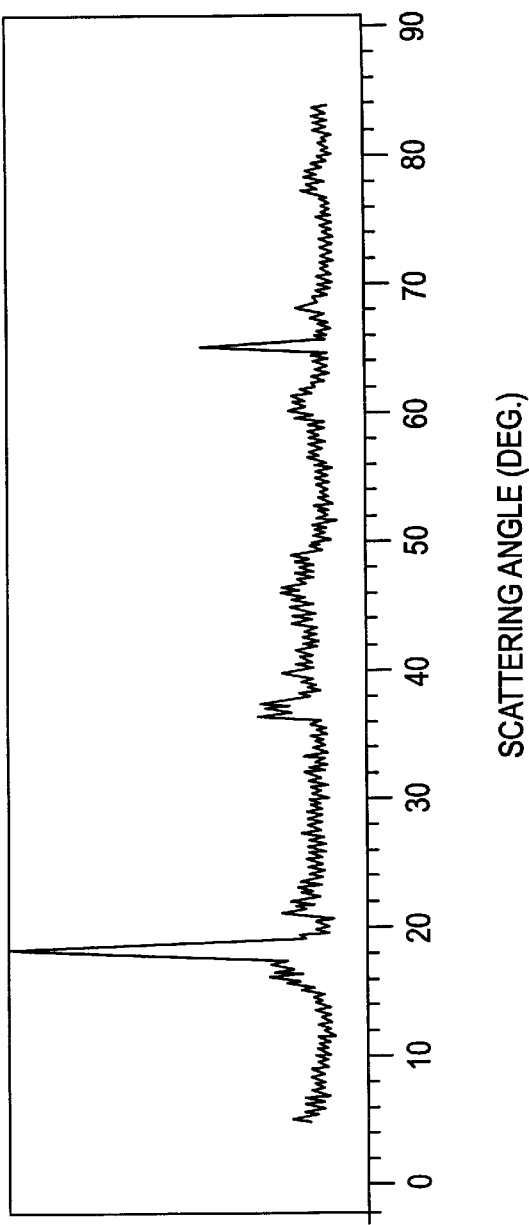

FIG. 2A is an X-ray diffraction pattern of the layered $LiMnO_2$; FIG. 2C is an X-ray diffraction pattern of the $Li_xMn_{0.82}Co_{0.18}O_2$.

These layered lithium manganese oxide bronzes can be used as an active material in an electrochemical cell that allows for the extraction or insertion of lithium into bronze. One electrode of this electrochemical cell would be made of this bronze or would comprise this bronze. This electrochemical cell can be of the rechargeable type as these bronzes allow for the reversible insertion and extraction of lithium. Specifically, a lithium-ion cell can be made that would be assembled comprising a negative electrode capable of inserting lithium, a lithium-ion-containing electrolyte, and a positive electrode comprising the subject layered lithium manganese oxide bronzes. In such applications, the compositions may be supported with or without compounding. For example, the compositions in the form of powders can be compounded with an inert binder; by "inert" we mean materials which do not react chemically or electrochemically with the electrolyte or electrode materials used in the lithium battery. Examples of the inert material include polymeric materials, such as polyvinylidene fluoride, teflon, polyethylene, vinylidene fluoride-hexafluoropropylene copolymers. Conducting diluents may be admixed with the subject layered lithium manganese oxide compositions. Thus carbon black, graphite and other conducting diluents may be added to the electrode compound. When compounded, the amount of the layered bronze in the compounded composition for the cathode production can range from 1 to 99 weight percent.

In accordance with the invention, the layered lithium manganese oxide materials themselves are produced by ion exchange of a sodium manganese oxide bronze of P2 structure. An X-ray diffraction pattern of the sodium manganese oxide bronze of P2 structure appears in FIG. 1. The $\alpha$-$Na_{0.7}MnO_2$ is a structure of the P2 type. This structure can be written as $Na_{2/3}MnO_2$. It was determined that $\alpha$-$Na_{2/3}MnO_2$ yields $Li_{2/3}MnO_2$ after ion exchange. For comparison $LiMnO_2$ with the O3 structure prepared by methods similar to Bruce and Armstrong was also investigated in this work.

The crystal structure of $Na_xMnO_{2+y}$ is highly dependent on preparation conditions (oxygen partial pressure, pO2, and temperature T) as well as on the composition x. Phases with different oxygen stoichiometry are known. Oxygen rich $\alpha$-$Na_{0.7}MnO_{2+x}$ is stable at low temperatures and has the hexagonal P2 structure, whereas high temperature $\beta$-$Na_{0.7}MnO_2$ has lower oxygen stoichiometry but has a distorted crystal structure (an orthorhombic-distorted P2 structure).

Production of the sodium manganese oxide bronze of P2 structure involves providing a mixture of oxide sources. The oxide sources include $Mn_2O_3$, $Li_2CO_3$, $Na_2CO_3$; and optionally a M-oxide or M-hydroxide (e.g. $Co_3O_4$, is included, when the cobalt doped layered lithium manganese oxide is to be produced.) M is Li or Aluminum (Al) or a 3d transition metal selected from the group consisting of Co, Ni, Ti, V, Cr, Cu, and Fe. When M is the 3d transition metal, the oxide sources can be $Co_3O_4$, CoO, $Ni(OH)_2$, $TiO_2$, $V_2O_5$, $Cr_2O_3$, CuO, and $Fe_2O_3$. When M is Al, $Al(OH)_3$ can be used as an aluminum source. In principle, it could be possible to suppress the phase transition to Spinel by proper doping. Bruce reported the possibility of stable layered $LiMn_{1-x}Co_xO_2$ by ion exchanging $NaMn_{1-x}Co_xO2$. We were not successful in our attempts to prepare layered $LiMn_{1-x}Co_xO_2$. It has been shown that heavy chromium doping stabilizes the layered structure. Dahn et. al. reported layered and thermodynamically stable $LiMO_2$ with M=$Mn_{1-x}Cr_{x-y}Ni_{y/2}$, which cycled well J. R. Dahn et al., *J. Electrochem. Soc.* 145, 851 (1998). However, a material with a large chromium content is not desired because chromium is toxic and relatively expensive.

The oxide sources are provided in stoichiometric amounts, which means that masses of reactants are selected based on their molar weights so that the correct molar ratios are incorporated to give the desired products. The reagent oxide sources are thoroughly admixed; this can be done by milling. Thereafter the admixture can be pelleted. The admixture is subject to calcination in air at temperatures of at least 500° C. for a time duration sufficient to cause bronze formation; the temperature may range up to 900° C. After calcination, the calcined mixture can be quenched. In embodiments below, the initially calcined mixture is subject to a second calcination at temperatures of at least 500° C.; a quench stage (in liquid nitrogen) is employed between two calcinations. In specific embodiments below, the admixture was calcined at temperatures of at least 750° C.; preferably there are two calcinations. The calcined mixture is quenched in liquid nitrogen and subjected to a second air calcination at temperatures of at least 750° C. The calcinations, in accordance with the invention, were conducted in air. Some calcinations in the examples were conducted in argon, an inert atmosphere; these calcinations were for production of other than layered bronzes of O2 structure. The exact choice of temperature conditions and atmosphere may vary with the choice of M and y.

The calcined material is then subjected to ion exchange. In preferred embodiments, the calcined material is subjected to ion exchange, after it has been milled to fine powder. The calcined material is subjected to ion exchange by treatment with large excesses of LiBr, in refluxing n-hexanol. The minimum amount of LiBr is that needed to replace sodium cation, on a one-to-one basis, if the free energy of the system is lowered when lithium replaces sodium, in the ion exchange. The absolute minimum amount has not been the subject of these studies. Thereafter the powder is isolated; it may then be rinsed and air dried.

Ion exchange of $Na_xMnO_{2+y}$ yields $Li_xMnO_{2+y}$. Battery applications require that as much lithium as possible can be extracted from the structure. The most useful compounds will therefore have a small mean Mn oxidation state (since lithium only can be extracted until Mn reaches oxidation state 4+) and large x. The layered phase, $Li_2MnO_3$, for example, can not be charged (no lithium can be extracted) since the Mn oxidation state already is 4+. The channel structure material $Li_{0.44}MnO_2$ prepared by ion exchanging $Na_xMnO_2$ cycles well without transformation to spinel, according to M. Doeff et al., *J. Electrochem. Soc.* 143, 2507 (1996) and A. R. Armstrong et al., *J. Mater. Chem.* 8, 255 (1998). However it does not have a sufficient charge capacity since x is only 0.44. However, with 130 mAh/g theoretical capacity, it does not have sufficient charge capacity since x is only 0.44. Our approach focuses on layered O2 $Li_{2/3}MnO_2$ obtained from P2 $Na_{2/3}MnO_2$. The maximum expected charge capacity is significantly larger, approximately 190 mAh/g. This work will show that layered lithium manganese oxide of the O2 structure exists, can be prepared and cycles well without conversion to spinel.

EXAMPLES

The sodium manganese bronzes used as starting material for the ion exchange were prepared by solid state reaction from stoichiometric amounts of $Mn_2O_3$ (Aldrich), $Li_2CO_3$ (FMC), $Co_3O_4$ (Aldrich) and $Na_2CO_3$ (Aldrich). The powders were milled carefully to mix them (Retsch RM-0 autogrinder), and pellets (diameter=1 cm, length=0.5 cm) were pressed. Two different methods of solid state calcination were performed.

Example 1

$Na_{2/3}[Li_{1/6}Mn_{5/6}]O_2$ (P2-type) [Method 1]:

The pellets were heated 2 days at 800° C. in air and were then quenched in liquid nitrogen, followed by a careful milling and pressing of new pellets. A final heating at 800° C. (1 day) followed by quenching to liquid $N_2$ was made. The X-ray diffraction pattern of this product is illustrated in FIG. 1.

Example 2

$NaMnO_2$ (O3-type) [Method 2]:

The pellets were heated for two days in a flow of argon at 800° C. The pellets were milled and new pellets were pressed which were heated in argon at 800° C. for 1 day.

Example 3

Ion exchange of the example 1 and example 2 compositions was undertaken: Ion exchanges of the material of Example 1, following the procedure below, resulted in a product of the invention; ion exchange of the material of Example 2 produced a composition used for comparative purposes.

The pellets were milled carefully before ion exchange was attempted, because we found that fine powders give better results. The fine powder was added to a boiling solution of 5M lithium bromide (10 times excess) in n-hexanol. In the case of air sensitive powders ($\alpha$-$NaMnO_2$ is air sensitive) rapid manipulations are required. Since air might dissolve in the solution, ion exchange in a solution under inert gas was tried, but did not give significantly different results. The ion exchange was made for ≅8 hours at ≅180° C. under reflux. Finally, the mixture was filtered to recover the powder and the powder was rinsed in methanol. The powders were dried in air.

Example 4

The preparation of electrochemical cells was undertaken as follows: Powders of the cathode materials were mixed with 10% by weight Super S (MMM Carbon) carbon black. PVDF binder dissolved in 1-methyl pyrrolidinone was added (so that the weight of the binder in the electrode after drying would be 5%) until a thick slurry was obtained. The slurry was tape cast using the doctor blade technique on an aluminum foil. 2325 type coin-cells were prepared using lithium as the anode, a Celgard #2502 membrane as the separator and 1M $LiPF_6$ in 33%EC+67%DEC (Mitsubishi Chemical) as the electrolyte.

Example 5

Electrochemical Testing

The cells were charged and discharged with a small constant current (C/40 rate for removing x=1 in $Li_xMnO_2$) from 2V to an upper voltage of 4.2V. Typical currents were 30–50 $\mu A$. After 2–3 charge-discharge cycles the upper voltage was increased by 0.2 V sequentially until 4.8 V was reached.

Example 6

X-ray Investigation

X-ray powder diffraction was made using a Siemens D500 diffractometer. Rietveld profile refinement of the collected data was made using the Hill and Howard's version of the Rietveld program. Rietveld refinement of layered structures can be a problem because powder pressed onto a holder may show preferential orientation.

To reduce the anisotropy, the powder was sprinkled onto a zero-background holder (a Si wafer cut on the 510 plane) which was wetted with acetone. Some of the phases investigated (e.g. $NaMnO_2$) are not sufficiently stable to x-ray directly in air. Diffraction patterns of air-sensitive powders were measured in argon, using a special holder equipped with kapton windows.

Example 7

Chemical analysis:

Approximately 0.1 g of the samples was accurately weighed into small beakers. 3 mL hydrochloric acid and 1mL nitric acid were added and the covered beaker was heated for 45 minutes. The watch glass cover was removed and the acid was evaporated until 1.5 mL remained. Upon cooling the sample was transferred to a 50 mL centrifuge tube and diluted to 25 mL with deionized water. Elemental analysis was performed using a Jarrell-Ash 61E ICP using the element method. Oxygen stoichiometries were obtained by difference.

Discussion of Results

A.} Sodium-Manganese Bronzes Prepared by Solid State Reaction

Samples with overall composition $Li_xNa_{1-x}MnO_y$, but different x were prepared by method one. Single-phase material was only achieved for $NaMnO_2$ (x=0) and for 0.2>x>0.16. The first is the known $\alpha$-$NaMnO_2$ (O3) and the latter has the same crystal structure as $\beta$-$Na_{0.7}MnO_2$ which is the desired (P2) structure. For ion exchange the P2 phase with x=0.2 (which can be written as $Na_{2/3}[Li_{1/6}Mn_{5/6}]O_2$) was selected. For comparison, the O3 $\alpha$-$NaMnO_2$ sample prepared by method 2 was ion exchanged.

The diffraction pattern of $Na_{2/3}[Li_{1/6}Mn_{5/6}]O2$ is shown in FIG. 1. It can be indexed as a structure with the most symmetric hexagonal space group $P6_3/m\ 2/m\ 2/m$. The result of the Rietveld refinement is very similar to results published for $Na_{0.7}CoO_2$, by R. J. Balsys et al., *Solid State Ionics* 93, 279 (1996), and proves that the desired (P2) structure was achieved. It is believed the small difference between the calculated and measured data is caused by preferred orientation. The asterisks show the positions where ¼ ¼ 0 and ¼ ¼ 2 superstructure peaks would fall if the material had such a superstructure. The small peak at 22° could be due to impurities or to a superstructure. Rietveld refinement shows that the lithium occupies octahedral manganese sites implying that the structure should be written as $Na_{2/3}[Li_{1/6}Mn_{5/6}]O_2$.

A chemical analysis was made for the $Na_{2/3}[Li_{1/6}Mn_{5/6}]O_2$ sample. The result was $Na_{0.707}[Li_{0.167}Mn_{0.832}]O_{2.35}$. The cation ratios are exactly as expected, and the oxygen stoichiometry is larger than expected. However, since the oxygen stoichiometry was obtained from a small difference between large numbers it has a large error.

B.} Layered Lithium Manganese Oxides obtained by Ion exchange

Ion exchange was successful, both for the (O3) and the (P2) sodium bronzes. FIG. 2 (FIGS. 2A–2D) shows the X-ray diffraction pattern of four different materials obtained by ion exchange of sodium bronzes. FIG. 2A shows the diffraction pattern of O3 $LiMnO_2$ obtained from $NaMnO_2$. The ion exchange is estimated to be 90–95% complete, based on the small residue peaks from $NaMnO_2$ in the pattern. The agreement between the calculated and measured pattern is quite good. FIG. 2B shows the diffraction pattern of $Li_{2/3}[Li_{1/6}Mn_{5/6}]O_2$ obtained by ion exchanging $Na_{2/3}[Li_{1/6}Mn_{5/6}]O_2$. Notice that the 003 peak (at 16°) from the Na phase is almost eliminated showing that the ion exchange is almost complete and that the pattern differs greatly from that of the O3 phase. Chemical analysis of this sample showed it to be $Li_{1.096}Na_{0.09}MnO_{2.783}$ which can be written as $Li_{0.75}Na_{0.076}[Li_{1/6}Mn_{5/6}]O_{2.319}$. For comparison, FIG. 2C shows the diffraction pattern of $Li_{2/3}[Li_{1/6}\{Mn_{0.82}Co_{0.18}\}_{5/6}]O_2$ obtained by ion exchanging $Na_{2/3}[Li_{1/6}\{Mn_{0.82}Co_{0.18}\}_{5/6}]O_2$ which also had the P2 structure. The pattern is very similar to that in FIG. 2B. Now we consider the reasons for the simultaneous presence of broad and narrow peaks in FIGS. 2B and 2C.

Sodium prefers prismatic or octahedral places and lithium only adopts octahedral coordination in these structures. The P2 structure with prismatic sites is not suitable for lithium. The oxygen stacking in the P2 structure is BA AB BA AB BA etc. During ion exchange the layers rearrange to make octahedral sites for lithium. This can be accomplished by gliding every second $O(Mn_{1-y}M_y)O$ layer in one direction (i.e. A becomes B) or alternatively, by gliding in the other direction (i.e. A becomes C). Both possibilities are energetically equivalent and lead to the same O2 structure with space group P3 ml, C. Delmas et al., *Mat. Res. Bull.* 17, 117 (1982).

The "ideal" O2-structure has a low symmetry, for example it has no inversion symmetry. The symmetry of a structure obtained by alternately gliding the second and fourth layers has higher symmetry. This structure is of the O4 type. It is very likely that for samples prepared by ion exchange at room temperature, the structure of the O2 or O4 materials will contain a large number of stacking faults. Most likely the stacking faults will be randomly positioned along the c-axis leading to a condition known as "turbostratic disorder". Describing $Li_{2/3}[Li_{1/6}Mn_{5/6}]O_2$ as an O2 structure with stacking faults or as an O4 structure with stacking faults is more or less a question of taste.

In more general terms the ion-exchanged materials exhibit structures that are based on stacking of alternating lithium-containing layers and layers of the form $O-(Mn_{1-y}M_y)-O$. Both the metal atoms in the $O-(Mn_{1-y}M_y)-O$ layer and the lithium in the lithium-containing layer are each surrounded by six oxygen atoms forming the corners of an octahedron. However, there are two types of oxygen atoms; those that are surrounded by six metal atoms forming the corners of an octahedron, and those that are surrounded by six metal atoms forming the corners of a triangular prism. The O2 and O4 structures are special cases of this general arrangement. O2 occurs when O sublayers with octahedrally and prismatically coordinated oxygen alternate leading to stacking . . . OPOPOPOP . . . ; O4 occurs when O sublayers are repeatedly stacked PPOPOOPO. With the presence of stacking faults O2-based structures become indistinguishable from O4 based structures. What these novel materials have in common is the presence of O sublayers with prismatically coordinated oxygen.

Stacking faults in layered structures result in diffraction patterns with sharp 001 and hk0 peaks. Most other peaks (mixed peaks) become broad. This is the case in FIGS. 2B and 2C.

Figure 2D:
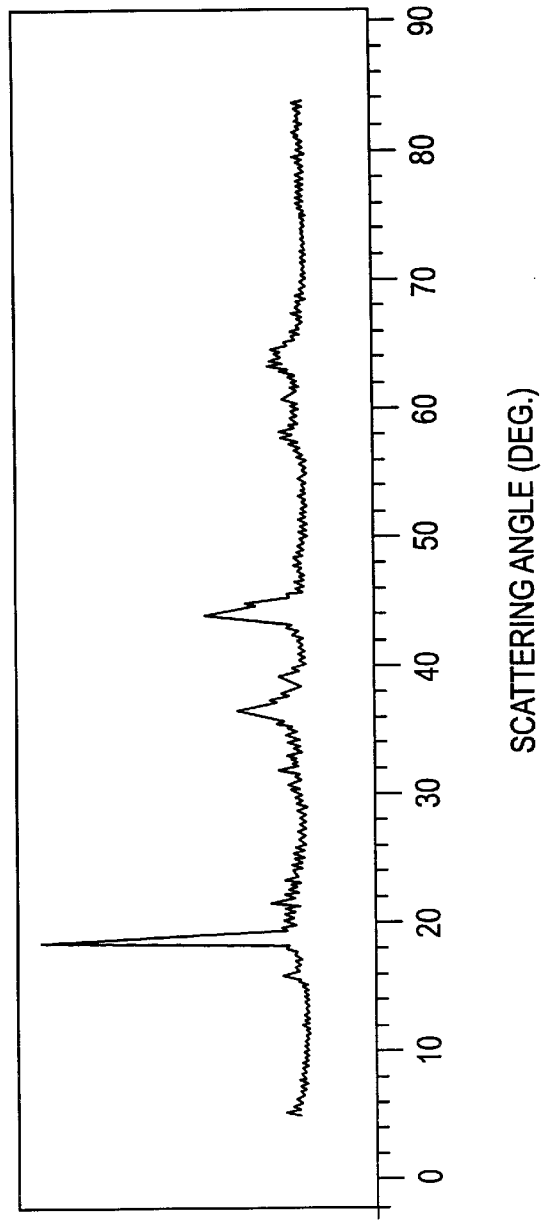

The ion exchange technique was also applied to other sodium manganese bronzes. According to C. Delmas, J. -J. Braconnier, A. Maazn, and P. Hagenmuller, Revue de Chimie Minerale 19,343 (1982), an oxygen rich P2 phase, $Na_{0.7}MnO_{2+y}$, exists if prepared at lower temperatures. We prepared this phase, but because of broad peaks (possibly due to stacking faults) the diffraction pattern which was similar to a P2-phase could not be indexed to our satisfaction. FIG. 2D shows that the pattern of the ion exchanged phase, $Li_{0.7}MnO_{2+y}$, exhibits peaks which are typical for the O2 phase of $Li_{2/3}[Li_{1/6}Mn_{5/6}]O_2$ (at ≅37° and 66°) and peaks which are more typical for the O3 phase $LiMnO_2$ (at ≅45°). Since the electrochemical properties of this material are inferior it will not be discussed further.

C. Electrochemical Results

The results of electrochemical testing for the samples described by FIG. 2 are displayed in FIG. 3. FIG. 3a shows the results for layered O3 $LiMnO_2$, which are in reasonable agreement with references, A. R. Armstrong and P. G. Bruce, Nature 381, 499 (1996) and G. Vitins and K. West, J. Electrochem. Soc. 144, 2587 (1997). However, the large capacity reported by Armstrong and Bruce et al. In Nature 381, 499 (1996) could not be repeated. The results of West and Vitins et al. *J. Electrochem. Soc.* 144, 2587 (1997) are more similar to ours, where capacities in the range of 100 mAh/g were achieved. The shape of the voltage profile changes in a few cycles to resemble that of spinel. FIG. 3b shows that when the cell made with the O2 cathode $Li_{2/3}$ $[Li_{1/6}Mn_{5/6}]O_2$ is initially charged to 4.2V, approximately 40 mAh/g of Li can be removed. About 60 mAh/g can be intercalated into the cathode during discharge. In the voltage range between 2 and 4.4 V the cell can be charged and discharged reversibly yielding a low capacity of ≅55 mAh/g. If the upper voltage is increased to 4.6V, then a large, irreversible plateau appears. This plateau indicates an irreversible phase transformation which occurs when the manganese oxidation state reaches 4. For $Li_{2/3}[Li_{1/6}Mn_{5/6}]O_2$, the Mn oxidation state reaches four when 1/6 of a mole of Li is extracted to form $Li_{0.5}[Li_{1/6}Mn_{5/6}]O_2$. This capacity (1/6 mole corresponds to 53 mAh/g) agrees well with that measured before the onset (about 50 mAh/g) of the large plateau in FIG. 3b. The phase transition does not "destroy" the cathode, instead the material cycles well and gives a reversible capacity in the range of 120 to 150 mAh/g. The shape of the curve is smooth and plateaus at ≅3 and ≅4V do not appear. Such plateaus are typical for spinel and are always observed if $LiMnO_2$ (orthorhombic) or $LiMnO_2$ (O3-type) are cycled for a few times. This indicates that the O2 material is more resistant to conversion to spinel than O3. The material cycles quite well.

Figure 3A:
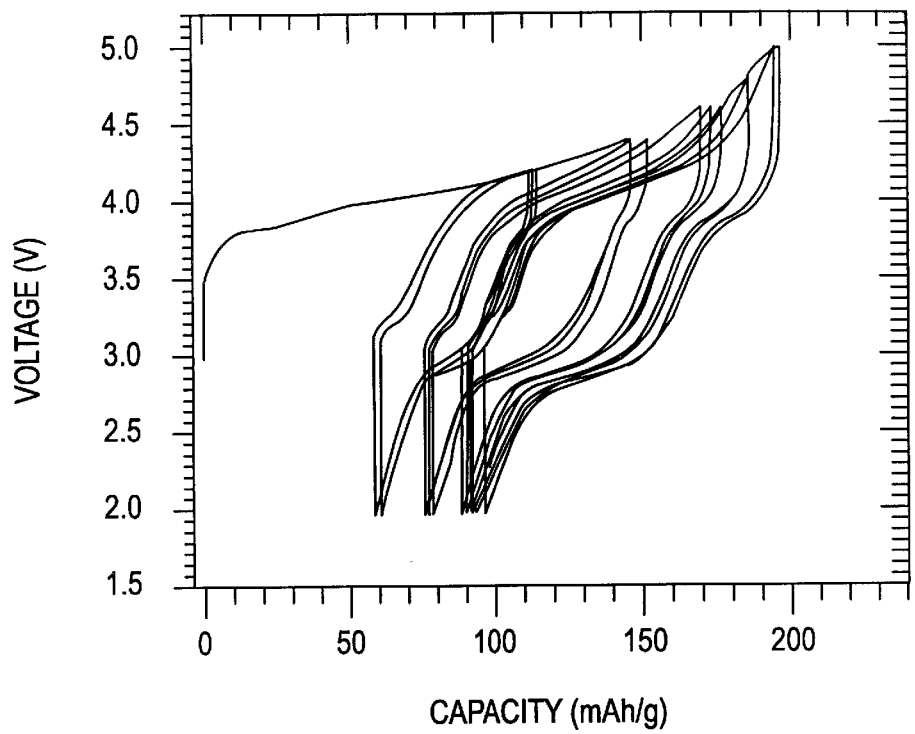
FIGS. 3A–3D include graphs of the plot of Voltage versus capacity for cells with different Li—Mn-Oxide cathodes, as indicated below.
Figure 3B:
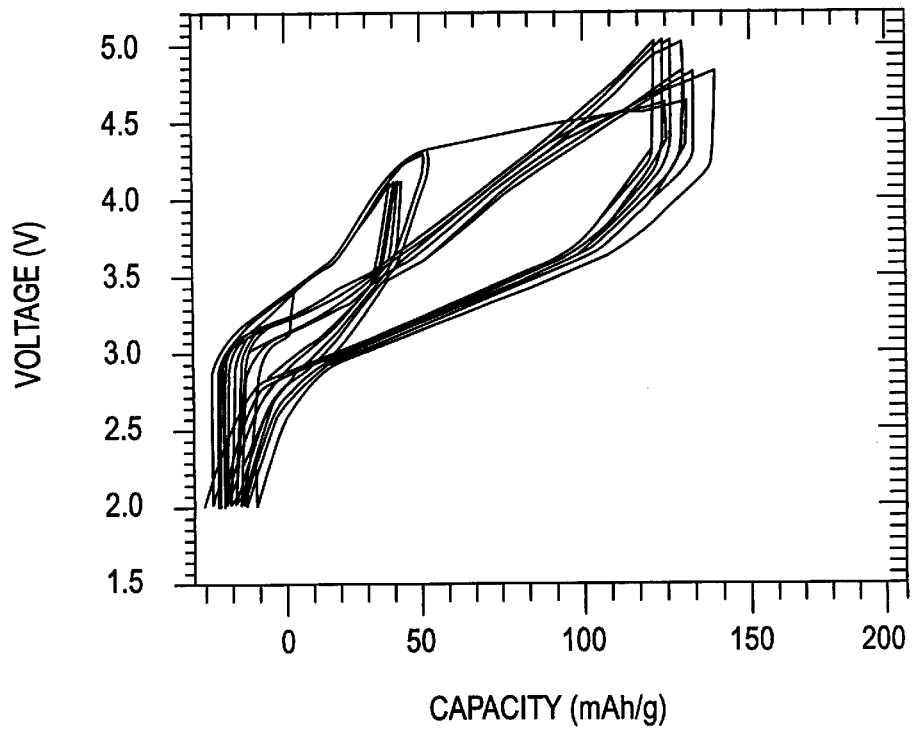
Figure 3C:
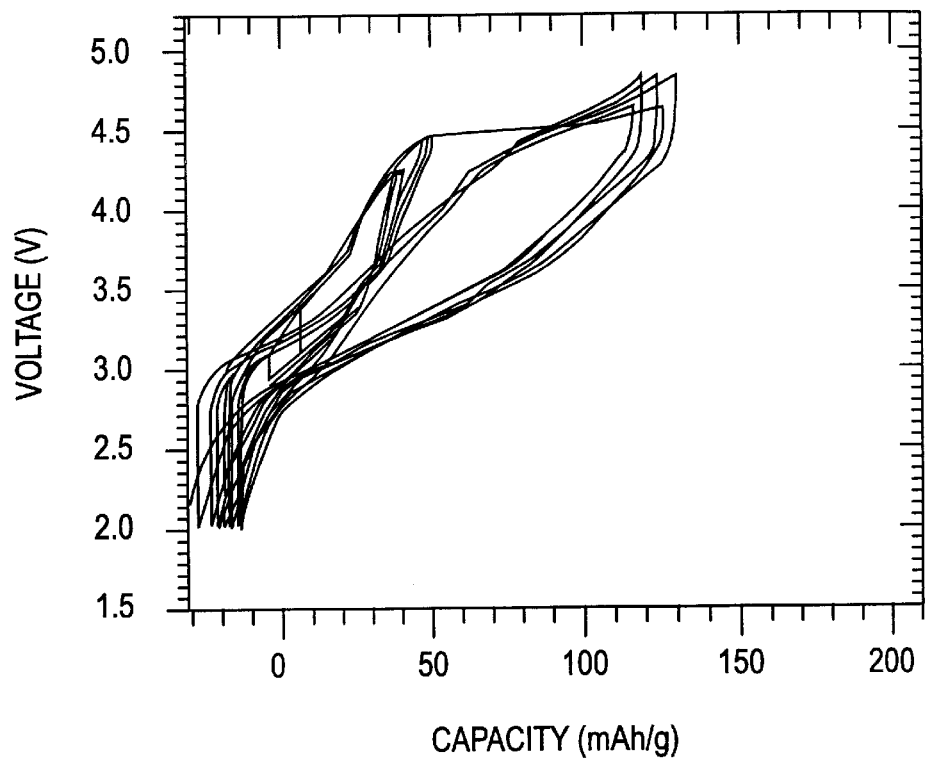
Figure 3D:
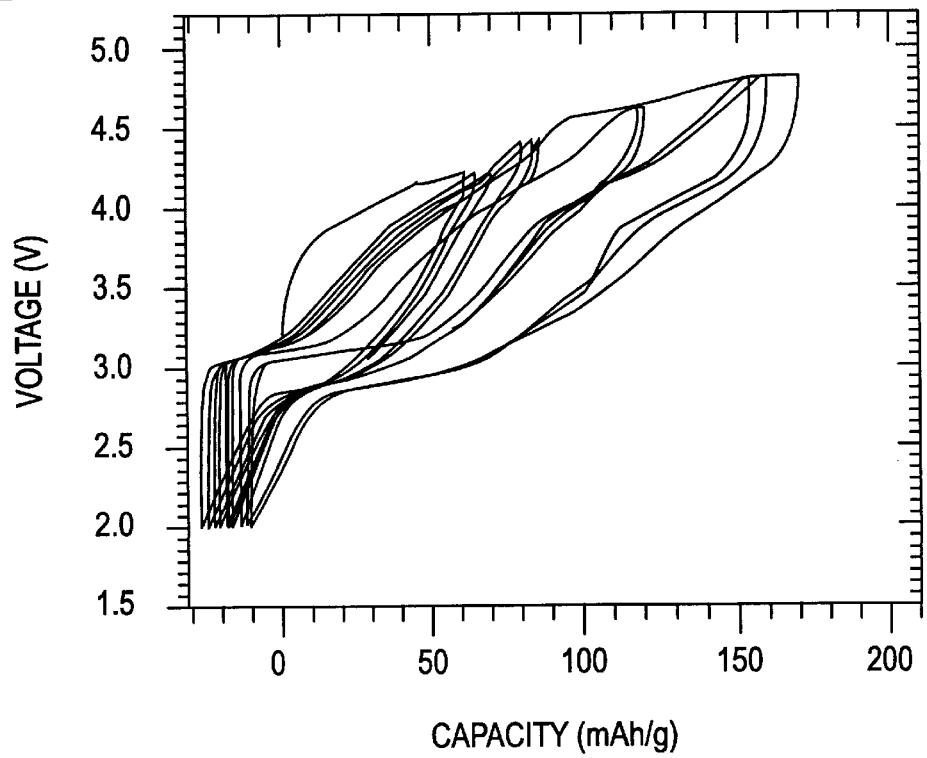
Figure 4A:
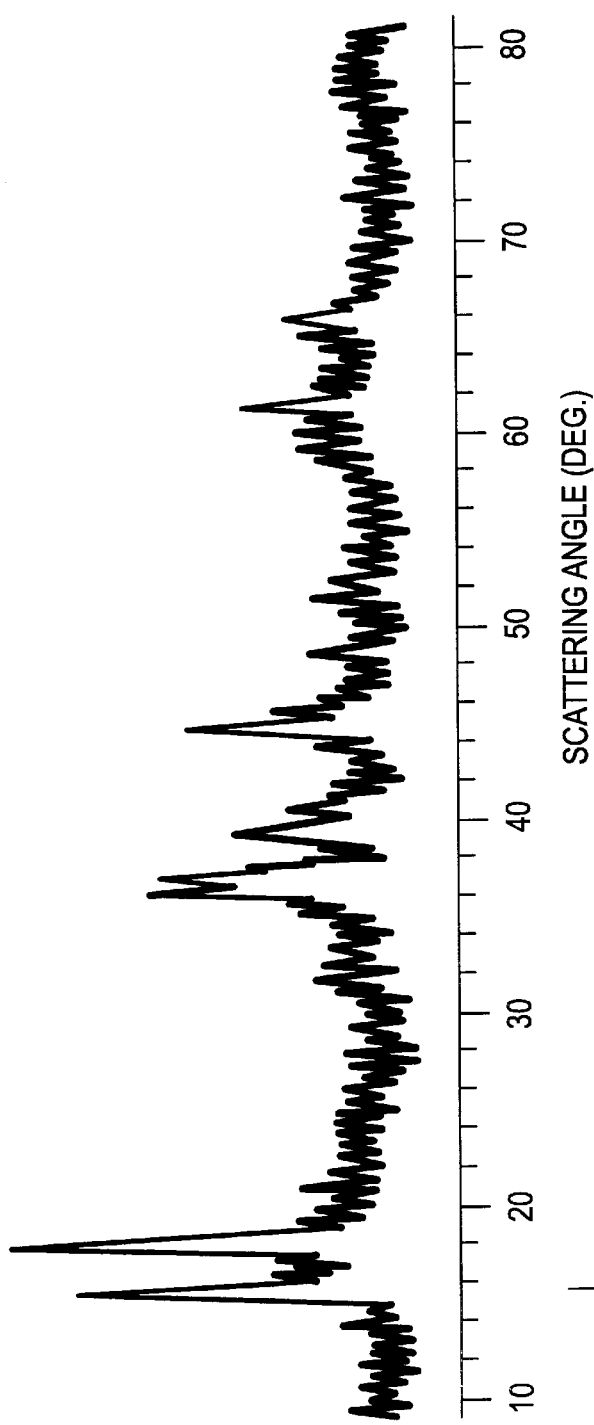
FIG. 4a) M=Li$_{1/18}$Mn$_{17/18}$—ion exchanged for Li.
Figure 4B:
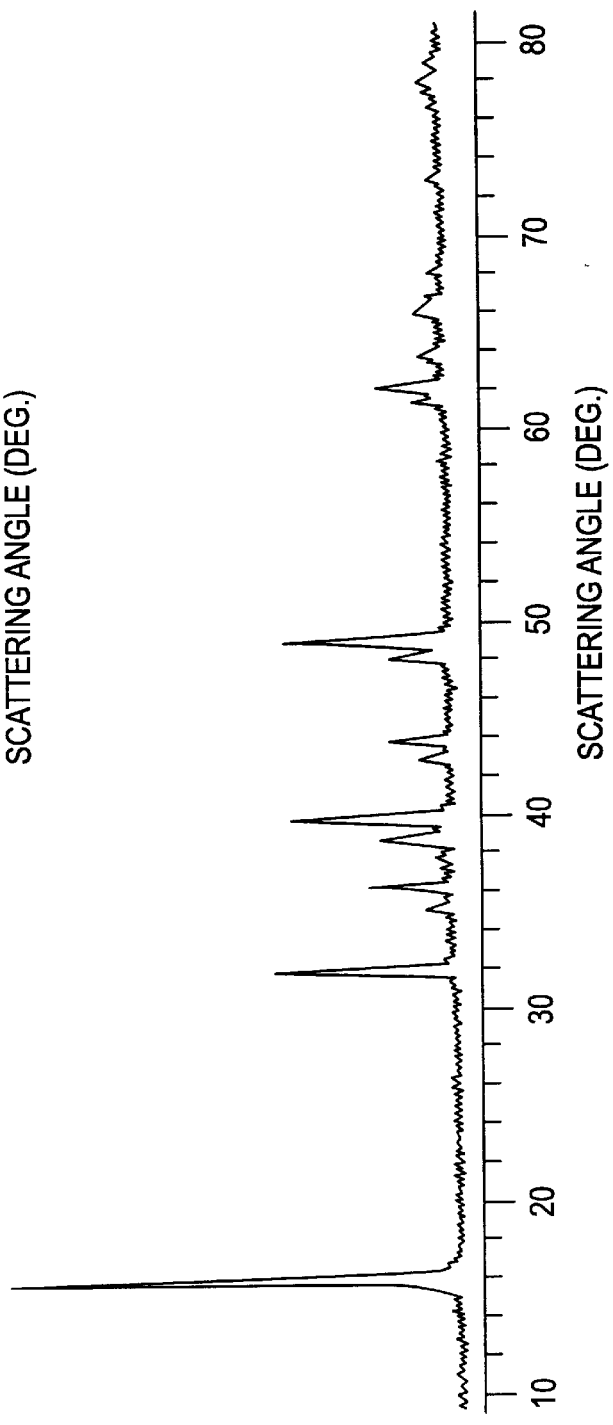
FIG. 4b) M=Li$_{1/18}$Mn$_{17/18}$—sodium starting material.
Figure 4C:
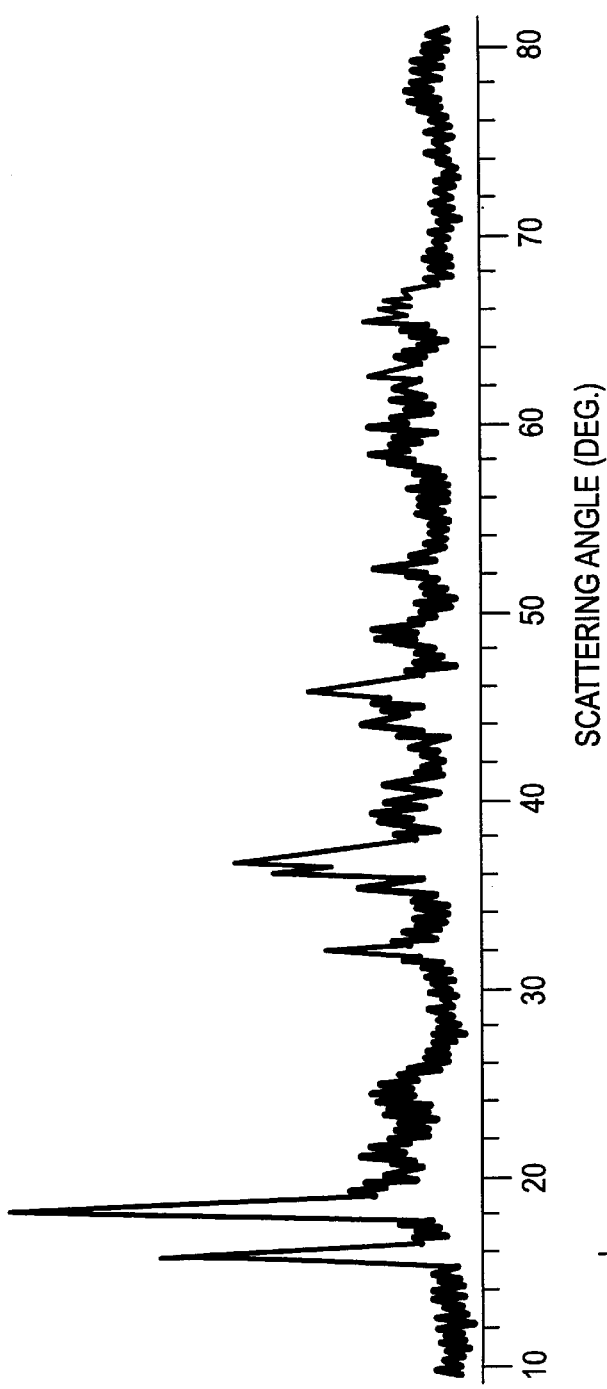
FIG. 4c) M=Mn$_{0.85}$Co$_{0.15}$—ion exchanged for Li.
Figure 4D:
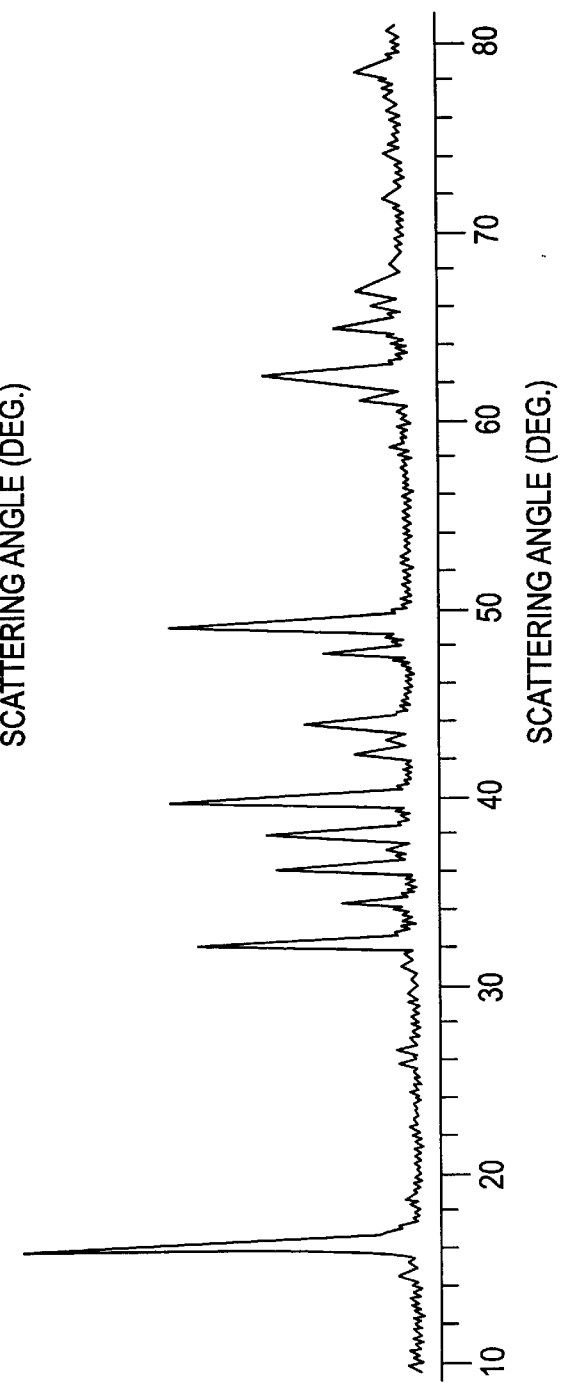
FIG. 4d) M=Mn$_{0.85}$Co$_{0.15}$ sodium starting material

The cobalt doped sample of the O2-type $Li_{2/3}[Li_{1/6}M_{5/6}]O_2$, $M=Mn_{0.82}Co_{0.18}$ (FIG. 3c), shows a behavior similar to the undoped sample. The behavior of the oxygen rich sample $Li_{0.7}MnO_{2+y}$ is shown in FIG. 3d. As in the case of O2 $Li_{2/3}[Li_{1/6}Mn_{5/6}]O_2$, it has a small reversible charge capacity in the range of 50 mAh/g to an upper limit of 4.2V. If the voltage increases to 4.6V, an irreversible reaction occurs. The final material cycles with a large capacity in the range of 150 mAh/g but it converts gradually to spinel as can be seen by the development of plateaus (FIG. 3d) at 3V and at 4V. This behavior is very different to the O2-type $Li_{2/3}[Li_{1/6}Mn_{5/6}]O_2$.

Ion exchange of P2-type $Na_{2/3}[Li_{1/6}Mn_{5/6}]O_2$ leads to O2-type $Li_{2/3}[Li_{1/6}Mn_{5/6}]O_2$. This layered lithium manganese oxide has a small reversible charge capacity to an upper cutoff voltage of 4.4 V. After increasing the upper cutoff voltage to 4.6V, an irreversible plateau was observed. This plateau is connected with irreversible changes to the layered phase. This altered phase need not necessarily be layered $Li_xMnO_2$. However, the large reversible capacity and the smooth charging and discharging curve suggest that the layered phase remains. It also seems likely, that the O2-oxygen stacking remains, since O3 or P3 stacking would convert to spinel. Such a plateau must be investigated further.

Samples of P2 $Na_{2/3}[Li_{1/18}Mn_{17/18}]O_2$ and $Na_{2/3}[Co_{0.15}Mn_{0.85}]O_2$ were prepared by solid-state reaction at higher temperatures. These were ion exchanged to give O2-type $Li_{2/3}[Li_{1/18}Mn_{17/18}]O_2$ and $Li_{2/3}[Co_{0.15}Mn_{0.85}]O_2$. FIG. 4 shows the X-ray diffraction patterns for the ion exchanged $Li_{2/3}[Li_{1/18}Mn_{17/18}]O_2$ and $Li_{2/3}[Co_{0.15}Mn_{0.85}]O_2$ samples, and for the starting P2-manganese bronzes $Na_{2/3}[Li_{1/18}Mn_{17/18}]O_2$ and $Na_{2/3}[Co_{0.15}Mn_{0.85}]O_2$ respectively. The P2 sodium manganese oxide phases have an in-plane orthorhombic distortion. The ion exchanged phases are O2 structures displaying stacking faults. Both contain some sodium manganese bronze since the ion exchange works less well for these materials.

Figure 5A:
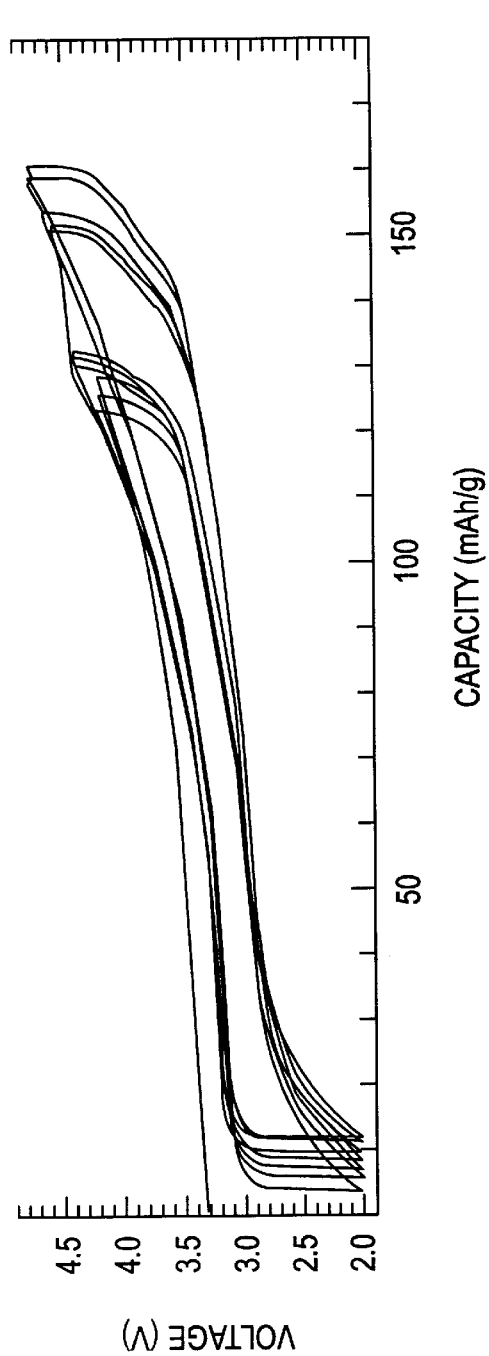
FIG. 5 presents an upper and a lower plot of Voltage versus capacity for cells with O2 type Li—Mn oxides cathodes with lower Mn oxidation state, in which the upper plot is Li$_{2/3}$[Li$_{1/18}$Mn$_{17/18}$]O$_2$ and lower plot is Li$_{2/3}$[Mn$_{0.85}$Co$_{0.15}$]O$_2$
Figure 5B:
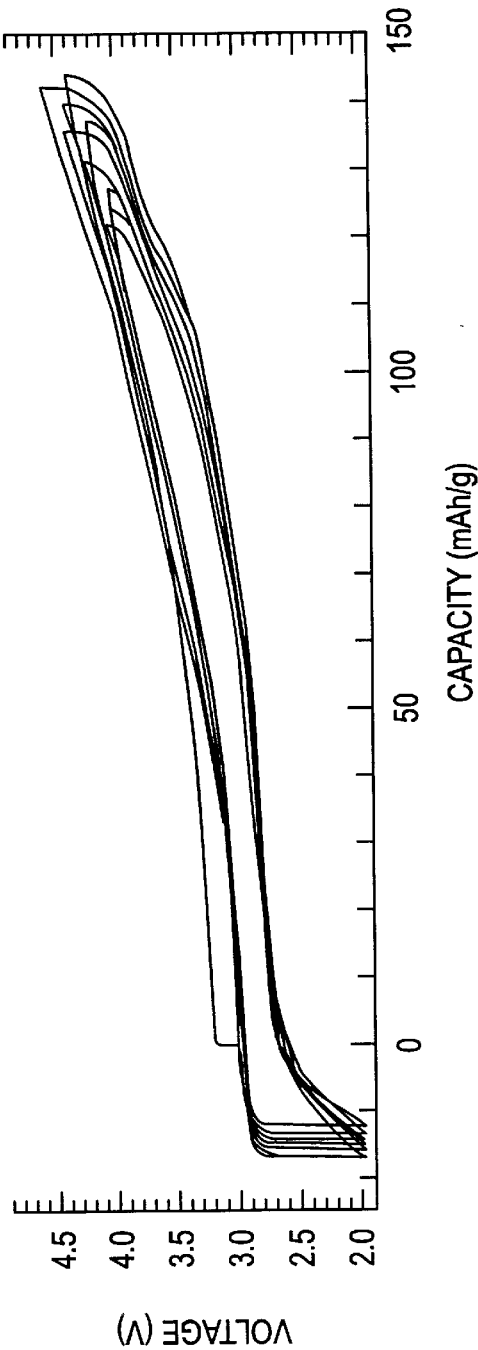

FIG. 5 shows the electrochemical behavior of these materials. The irreversible plateau is very short for $Li_{2/3}[Li_{1/18}Mn_{17/18}]O_2$ and is not observed for $Li_{2/3}[Co_{0.15}Mn_{0.85}]O_2$. The manganese oxidation state reaches 4.0 for $Li_{2/3}[Li_{1/18}Mn_{17/18}]O_2$ when 1/2 mole of Li is extracted (158 mAh/g) and all the Li can be extracted from $Li_{2/3}[Co_{0.15}Mn_{0.85}]O_2$ without all the Mn reaching 4+. These materials show smooth voltage profiles without evidence for conversion to spinel. They have reversible capacities near 150 mAh/g.

What is claimed is:

1. A rechargeable electrochemical cell, including a positive electrode, a negative electrode, and an electrolyte; one of the electrodes comprising a layered bronze, comprised of a structure which comprises a stack of two alternating layers, I and II, layer I having a composition of $X(M_yMn_{1-y})X$ wherein Mn is manganese, M is a 3d transition metal or aluminum or lithium or a mixture thereof, $0 \leq y < 0.4$, and X is any atom, anion or a mixture thereof, wherein Mn or M is surrounded by six anions forming the corners of an octahedron, and layer II containing lithium atoms on L-sites that form a perfect or distorted hexagonal lattice, said stack being subject to the L-sites of layer II being surrounded by six atoms or anions that form the corners of an octahedron some of the atoms or anions each being surrounded by three of M or Mn of a type-I layer and three L-sites of a type-II layer forming the corners of an octahedron, said bronze comprising Mn in an oxidation state of less than IV.

2. The rechargeable electrochemical cell of claim 1 where X is oxygen.

3. The rechargeable electrochemical cell of claim 1, which comprises a layered bronze, of the empirical formula $Li_x(Mn_{1-y}M_y)O_{2+z}$ wherein x is $0.5 < x < 1.3$ y is $0.0 \leq y < 0.4$ z is $-0.5 < z < 0.5$.

4. The rechargeable electrochemical cell of claim 1, where the stack forms an O2 structure by virtue of a stacking that exhibits anion sublayers with prismatically and octahedrally coordinated anions alternating in the stacking direction.

5. The cell of claim 1, wherein M is selected from the group consisting of lithium, cobalt, nickel, titanium, vanadium, chromium, copper, aluminum, and iron.

6. The cell of claim 1, wherein the layered bronze comprises layered $Li_{2/3}(Li_{1/6}Mn_{5/6})O_2$.

7. The cell of claim 1, wherein the layered bronze comprises layered $Li_{2/3}(Li_{1/6}\{Mn_{0.82}Co_{0.18}\}_{5/6})O_2$.

8. The cell of claim 1, wherein the layered bronze comprises $Li_{2/3}(Li_{1/18}Mn_{17/18})O_2$.

9. The cell of claim 1, wherein the layered bronze comprises a X-ray diffraction pattern the significant lines which are as follows:

| h | k | l | $2\theta_{obs}$ | $2\theta_{calc}$ | $d_{calc}$ |
|---|---|---|---|---|---|
| 0 | 0 | 2 | 18.340 | 18.468 | 4.8039 |
| 1 | 0 | 0 | 36.600 | 36.576 | 2.4567 |
| 1 | 0 | 1 | 37.500 | 37.797 | 2.3801 |
| 1 | 0 | 3 | 46.600 | 46.592 | 1.9492 |
| 1 | 0 | 5 | 61.000 | 61.238 | 1.5136 |

-continued

| h | k | l | $2\theta_{obs}$ | $2\theta_{calc}$ | $d_{calc}$ |
|---|---|---|---|---|---|
| 1 | 1 | 0 | 65.900 | 65.846 | 1.4184 |
| 1 | 1 | 2 | 69.100 | 69.041 | 1.3603. |

10. The cell of claim 9, wherein said significant lines can be measured to plus or minus 0.2 degrees.

11. The layered bronze of claim 9, wherein the layered bronze is comprised of a X-ray diffraction pattern the significant lines of which are as follows:

| h | k | l | $2\theta_{obs}$ | $2\theta_{calc}$ | $d_{calc}$ |
|---|---|---|---|---|---|
| 0 | 0 | 2 | 18.340 | 18.468 | 4.8039 |
| 1 | 0 | 0 | 36.600 | 36.576 | 2.4567 |
| 1 | 0 | 1 | 37.500 | 37.797 | 2.3801 |
| 1 | 0 | 3 | 46.600 | 46.592 | 1.9492 |
| 1 | 0 | 5 | 61.000 | 61.238 | 1.5136 |
| 1 | 1 | 0 | 65.900 | 65.846 | 1.4184 |
| 1 | 1 | 2 | 69.100 | 69.041 | 1.3603. |

12. The layered bronze of claim 11, wherein said significant lines can be measured to plus or minus 0.2 degrees.

13. The cell of claim 1, wherein the layered bronze comprises $Li_{2/3}(Mn_{0.85}Co_{0.15})O_2$.

14. A layered bronze, comprised of a structure which comprises a stack of two alternating layers, I and II, layer I having a composition of $X(M_y Mn_{1-y})X$ wherein Mn is manganese, M is a 3d transition metal or aluminum or lithium or a mixture thereof, $0 \leq y < 0.4$, and X is any atom, anion or a mixture thereof, wherein Mn or M is surrounded by six anions or atoms forming the corners of an octahedron, and layer II containing lithium atoms on L-sites that form a perfect or distorted hexagonal lattice, said stack being subject to the L-sites of layer II being surrounded by six atoms or anions that form the corners of an octahedron some of the atoms or anions each being surrounded by three of M or Mn of a type-I layer and three L-sites of a type-II layer forming the corners of an octahedron, said bronze comprising Mn in an oxidation state of less than IV.

15. The layered bronze of claim 14, wherein the layered bronze exhibits a reversible charge capacity in units of mAh/g, when cycled between 2V and 4.8V vs. Li.

16. The layered bronze of claim 14, which comprises the empirical formula $Li_x(Mn_{1-y}M_y)O_{2+z}$ wherein x is $0.5 < x < 1.3$ y is $0.0 \leq y < 0.4$ z is $-0.5 < z < 0.5$.

17. The layered bronze of claim 14, wherein M is selected from the group consisting of lithium, cobalt, nickel, titanium, vanadium, chromium, copper, aluminum and iron.

18. The layered bronze of claim 14, wherein the layered bronze comprises layered $Li_{2/3}(Li_{1/6}Mn_{5/6})O_2$.

19. The layered bronze of claim 14, wherein the layered bronze comprises layered $Li_{2/3}(Li_{1/16}Mn_{17/18})O_2$.

20. The layered bronze of claim 14, wherein the layered bronze comprises $Li_{2/3}(Li_{1/16}\{Mn_{0.82}Co_{0.18}\}_{5/6})O_2$.

21. The layered bronze of claim 14, wherein the layered bronze comprises $Li_{2/3}(Mn_{0.85}Co_{0.15})O_2$.

22. The layered bronze of claim 14, comprising two sublayers of $(Mn_{1-x}M_x)$, wherein Mn and M are as defined above, and two sublayers of oxygen atoms, in which one of said two sublayers of oxygen is prismatically coordinated and a second of said two sublayers of oxygen is octahedrally coordinated.

23. The layered bronze of claim 14, wherein at least some of six anions or atoms are oxygen.

24. The layered bronze of claim 14, wherein the stack forms an O2 structure by virtue of a stacking that exhibits anion sublayers with prismatically and octahedrally coordinated anions alternating in the stacking direction.

25. The layered bronze of claim 14, which is $Li_{2/3}(Mn_{0.85}Co_{0.15})O_2$.

* * * * *